(12) United States Patent
Patridge

(10) Patent No.: US 6,705,442 B1
(45) Date of Patent: Mar. 16, 2004

(54) MULTIPLE DISK CLUTCH/BRAKE ASSEMBLY

(76) Inventor: Arthur G. Patridge, 148 Valley Oaks Dr., Advance, NC (US) 27006

( * ) Notice: Subject to any disclaimer, the term of this patent is extended or adjusted under 35 U.S.C. 154(b) by 0 days.

(21) Appl. No.: 10/272,456

(22) Filed: Oct. 15, 2002

(51) Int. Cl.$^7$ ............................................... F16D 69/02
(52) U.S. Cl. ...................... 192/15; 192/18 R; 192/93 A
(58) Field of Search .......................... 192/15, 16, 18 R, 192/93 A; 56/11.3

(56) References Cited

U.S. PATENT DOCUMENTS

| | | | |
|---|---|---|---|
| 2,378,117 A | | 5/1945 | Whiting |
| 4,141,439 A | | 2/1979 | Lunde et al. |
| 4,205,509 A | | 6/1980 | Miyazawa et al. |
| 4,213,521 A | | 7/1980 | Modersohn |
| 4,286,701 A | | 9/1981 | MacDonald |
| 4,352,266 A | * | 10/1982 | Lloyd et al. .................. 56/11.3 |
| 4,372,433 A | | 2/1983 | Mitchell et al. |
| 4,377,224 A | | 3/1983 | Takata et al. |
| 4,388,988 A | * | 6/1983 | MacDonald ........... 192/12 BA |
| 4,524,853 A | | 6/1985 | Nagai |
| 4,538,712 A | | 9/1985 | Nagai |
| 4,730,710 A | * | 3/1988 | Granitz ..................... 192/18 R |
| 5,033,595 A | | 7/1991 | Pardee |
| 5,549,186 A | * | 8/1996 | Pardee ..................... 192/18 R |
| 5,570,765 A | | 11/1996 | Patridge |
| 5,749,208 A | | 5/1998 | Wuebbels et al. |
| 6,397,992 B1 | * | 6/2002 | Patridge ....................... 192/15 |

* cited by examiner

*Primary Examiner*—Richard M. Lorence
(74) *Attorney, Agent, or Firm*—Michael Best & Friedrich LLP

(57) ABSTRACT

A clutch/brake assembly for use on a riding lawnmower or other powered equipment includes a pair of input disks, a pair of output disks, and a housing. An output pulley is coupled for rotation with the output disks and is coupled to at least one working shaft, such as a blade shaft supporting a cutting blade of the lawnmower. The input and output disks are disengaged from each other when the clutch/brake assembly is in a braking condition. Also, when in the braking condition, at least one of the output disks is biased against a braking surface of the housing to resist rotation of the output pulley and the working shafts. An actuator assembly is also included in the clutch/brake assembly, and is actuable to substantially simultaneously disengage the output disks from the braking surface of the housing and sandwich the input and output disks together. When sandwiched together, the input and output disks are coupled for rotation together by the frictional forces therebetween.

37 Claims, 12 Drawing Sheets

MULTIPLE DISK CLUTCH/BRAKE ASSEMBLY

BACKGROUND

The invention relates to a clutch/brake assembly for use on a lawnmower or other powered equipment.

Clutch/brake assemblies of the type described herein are commonly used on devices such as riding lawnmowers and small tractors. The clutch/brake assembly allows the user to selectively engage the clutch to drive auxiliary equipment such as a lawnmower blade, snowblower screw, etc. In addition, the clutch/brake assembly provides a brake mechanism that stops the rotation of the auxiliary equipment when the user disengages the clutch. Thus, the clutch gives the user full control of the rotation of the auxiliary equipment.

Due to the limited size of lawn tractors and riding lawnmowers, the mechanical components such as the clutch/brake assembly and the engine are made as small as possible. However, the clutch mechanism must be large enough to efficiently transfer the engine power to the blade or other driven accessory without wearing excessively or failing.

SUMMARY

The present invention provides a clutch/brake assembly including a plurality of disks that engage each other to transfer the rotation of a drive shaft to a driven shaft and associated an output pulley.

More particularly, the present invention provides a clutch/brake assembly including a pair of input disks movable between a braking position and a driving position and a pair of output disks movable between a braking position and a driving position. The assembly further includes a housing including a braking surface and a biasing member biasing at least one of the output disks against the braking surface of the housing to resist rotation when the disks are in their respective braking positions. An actuator assembly is operable to substantially simultaneously disengage the output disks from the braking surface of the housing and sandwich the input and output disks together in the driving position such that the input and output disks are coupled together for rotation by the frictional forces therebetween.

In preferred constructions, the input and output disks are movable axially relative to one another. A plurality of biasing members bias the disks toward the braking position.

In another embodiment, the invention provides a brake/clutch assembly comprising a housing, an input shaft supported for rotation relative to the housing, and a plurality of input disks connected to the input shaft. The assembly also includes a plurality of output disks rotatable relative to the input shaft. The plurality of output disks are selectively engagable with the plurality of input disks. At least one of the plurality of output disks is selectively engagable with the housing. A biasing member biases the at least one of the plurality of output disks into engagement with the housing. The assembly further includes an actuating member operable to move the input disks into engagement with the output disks and to simultaneously move the output disk out of engagement with the housing.

In preferred constructions, the input disks and the output disks are positioned to intermesh with one another when engaged.

In yet another construction, the invention provides a clutch/brake assembly comprising a housing, an input shaft supported for rotation relative to the housing, and an output device supported by the input shaft and selectively rotatable relative to the input shaft. The apparatus also includes a plurality of input disks coupled to the input shaft and axially movable relative to the input shaft and to one another between a braking position and a driving position. The input disks including a plurality of drive surfaces. A plurality of output disks are coupled to the output device and are movable axially relative to the output device and to one another between a braking position and a driving position. The output disks including a plurality of drive surfaces and a brake surface. An actuator member is operable between a braking position and a drive position. When in the braking position the brake surface contacts the housing and when in the drive position the drive surfaces of the input disks contact the drive surfaces of the output disks such that the output device rotates in conjunction with the input shaft. A biasing member biases the output disk brake surface into contact with the housing.

Other features and advantages of the invention will become apparent to those skilled in the art upon review of the following detailed description, claims, and drawings.

Figure 1:
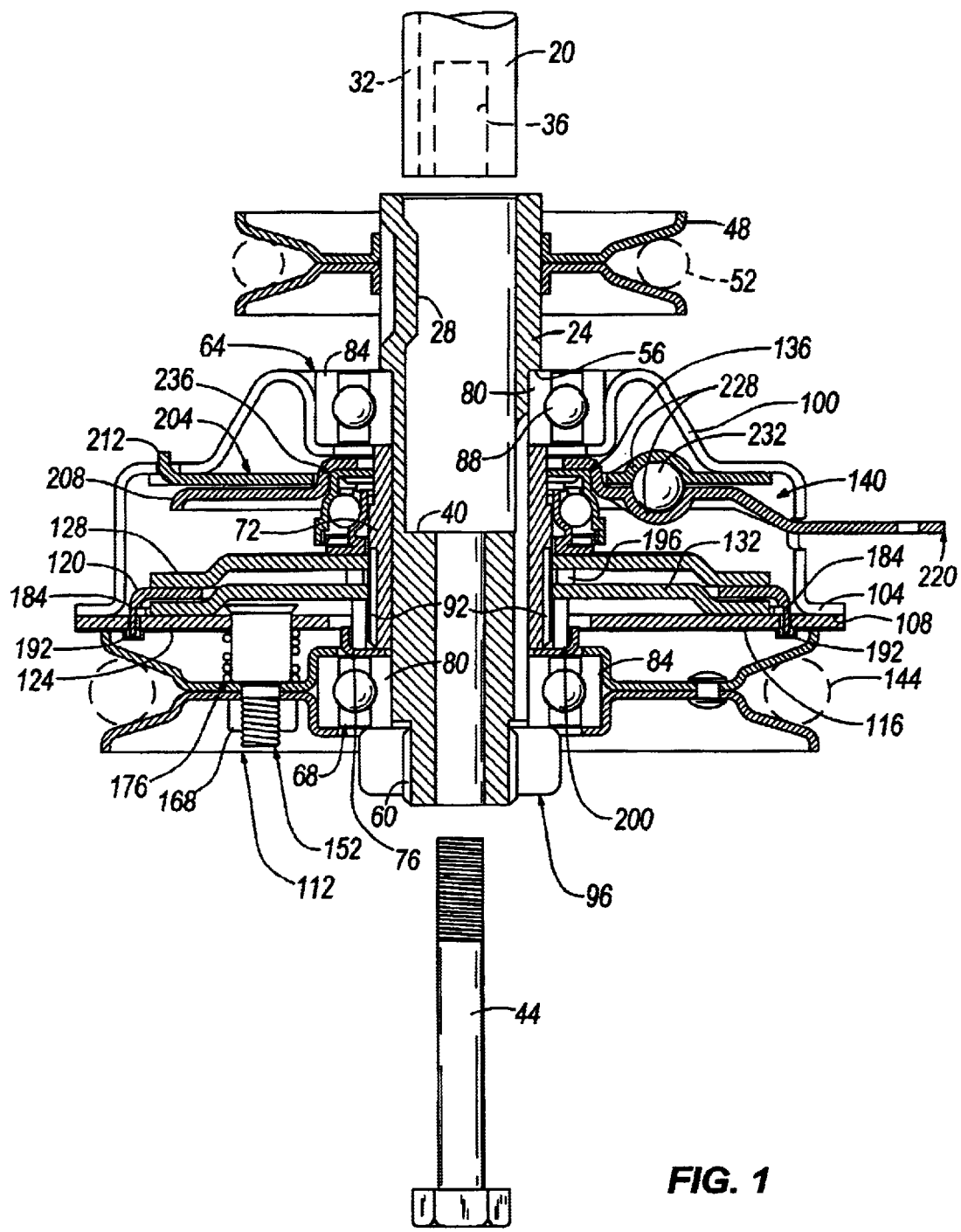
FIG. 1 is a cross-sectional view of a clutch/brake assembly embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Reference is made to a prior art clutch/brake assembly disclosed in U.S. Pat. No. 5,570,765, and invented by the present inventor. The entire contents of U.S. Pat. No. 5,570,765 are incorporated herein by reference.

FIG. 1 illustrates a portion of a drive system for a powered implement or vehicle (not shown), such as a riding lawnmower. Although the invention is discussed below with respect to the illustrated embodiment, the invention may be embodied in other implements, and should not be regarded as limited to a riding lawnmower application.

The vehicle includes an internal combustion engine which is mounted to a riding lawnmower chassis. The engine could alternatively be an electric engine in some applications. The engine includes (FIG. 1) an output shaft 20 that extends down from the chassis and extends into an inner hub 24. The outer surface of the inner hub 24 is stamped to provide an indent or key 28 that extends inwardly of the inner hub 24. The output shaft 20 includes a keyway 32 (shown in phantom in FIG. 1) that engages the key 28 to afford common rotation of the output shaft 20 with the inner hub 24. The distal end of the output shaft 20 includes a threaded bore 36. The output shaft 20 is tightened against an inner shoulder 40 in the inner hub 24 by a bolt 44 that is threaded into the threaded bore 36. The head of the bolt 44 bears against the bottom surface of the inner hub 24.

Figure 2:
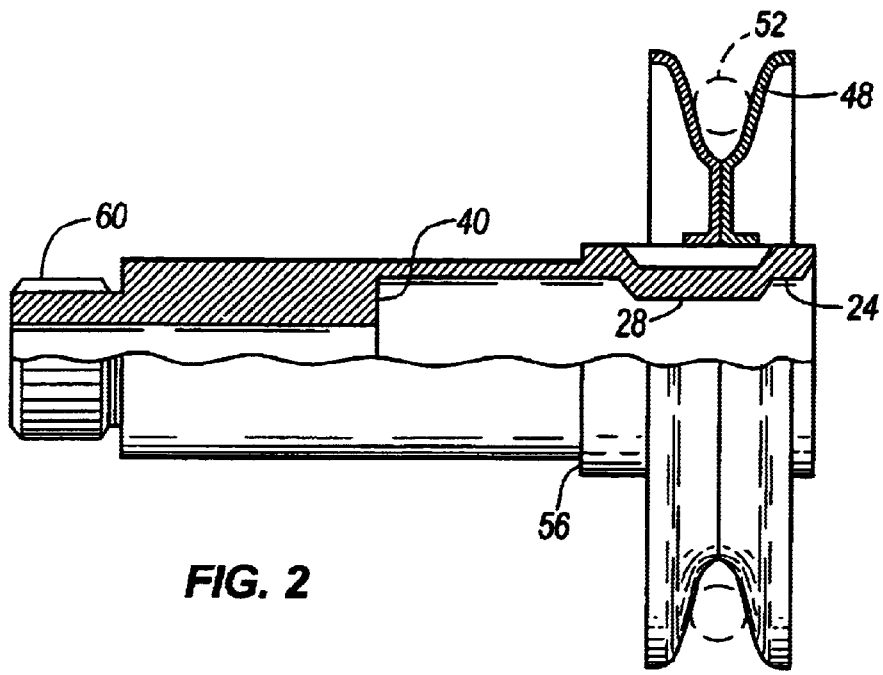
FIG. 2 is a partial cross-sectional view of the inner hub and transaxle pulley portion of the assembly.

As shown in FIGS. 1 and 2, a transaxle pulley 48 is welded to the outer surface of the inner hub 24, and rotates in common with the inner hub 24 and the output shaft 20. The transaxle pulley 48 engages a drive belt 52 that is operably driven by the transmission (not shown) of the riding lawnmower or other power equipment to which the engine is mounted.

Figure 3:
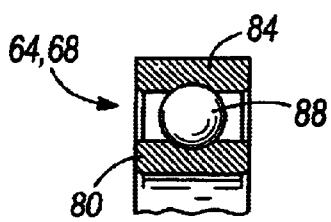
FIG. 3 is a partial view of a bearing of the assembly.
Figure 4:
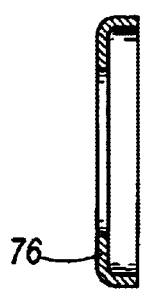
FIG. 4 is a cross-sectional view of the cup-shaped washer of the assembly taken along line 4—4 of FIG. 5.
Figure 5:
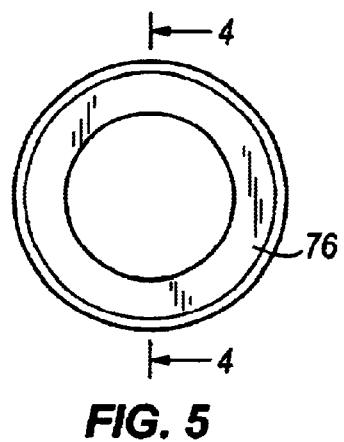
FIG. 5 is a top view of the cup-shaped washer.

The inner hub 24 also includes an outer downwardly-facing shoulder 56 and a threaded lower end 60. Between the outer shoulder 56 and the threaded lower end 60 are upper and lower bearings 64, 68 (FIG. 3), a splined collar 72, and a cup-shaped washer 76 (FIGS. 4 and 5). The upper and lower bearings 64, 68 each include an inner race 80 and an outer race 84 separated by balls 88, and the splined collar 72 includes a lower portion that has splines 92. A nut 96 is threaded onto the threaded lower end 60 of the inner hub 24 to capture the splined collar 72 and the cup-shaped washer 76 between the inner races 80 of the upper and lower bearings 64, 68. Tightening the nut 96 causes a frictional engagement between the inner races 80 of the upper and lower bearings 64, 68, the splined collar 72, the cup-shaped washer 76, and the inner hub 24, such that those parts rotate in common. Alternatively, a shaft including an integral splined section could be used.

Figure 8:
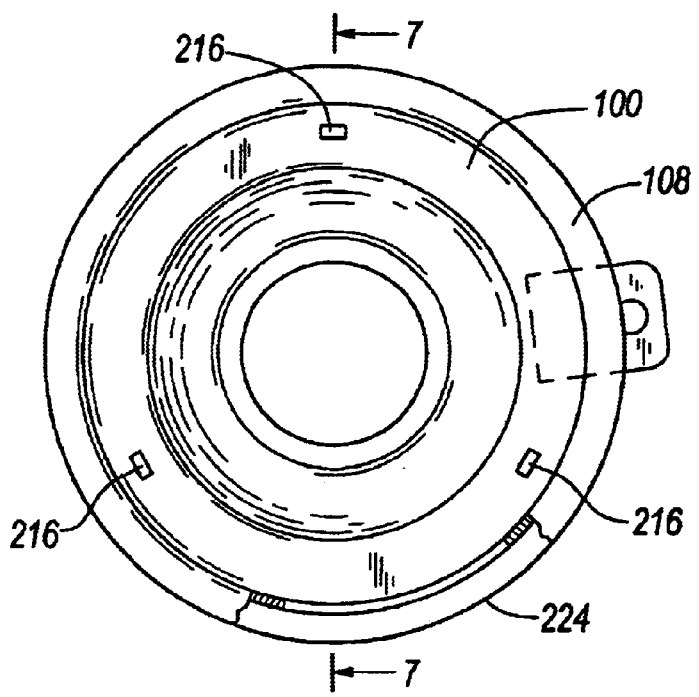
FIG. 8 is a bottom view of the housing of the assembly.
Figure 7:
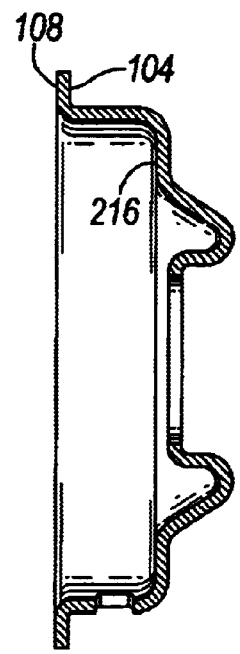
FIG. 7 is a cross-sectional view taken along line 7—7 in FIG. 8.
Figure 6:
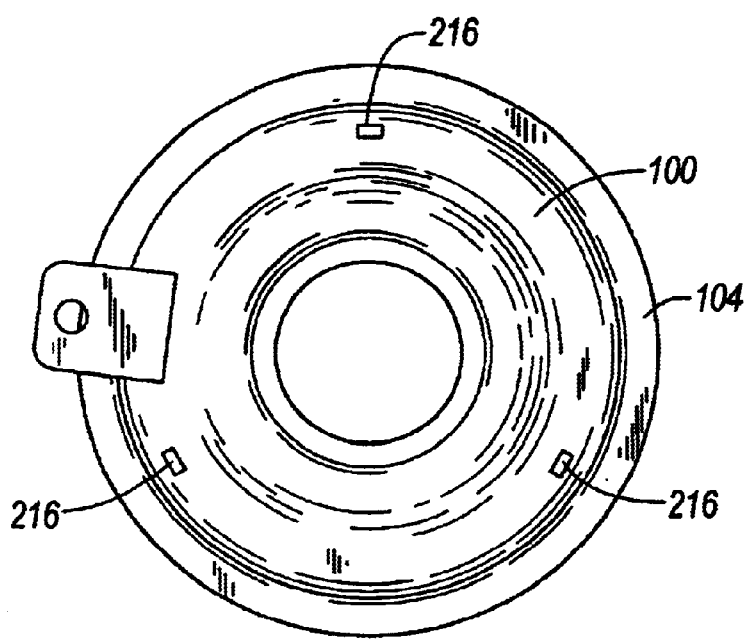
FIG. 6 is a top view of the housing of the assembly.
Figure 9:
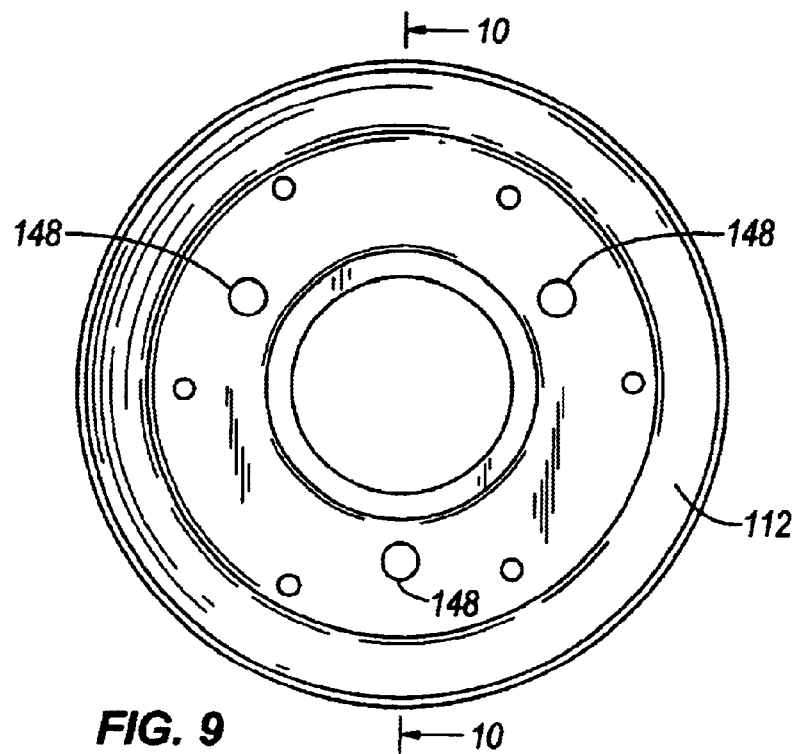
FIG. 9 is a top view of half of the output pulley.
Figure 10:
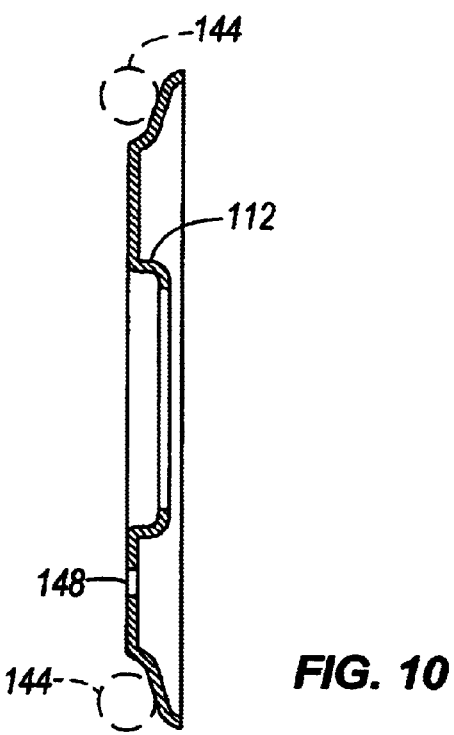
FIG. 10 is a cross-sectional view taken along line 10—10 in FIG. 9.
Figure 11:
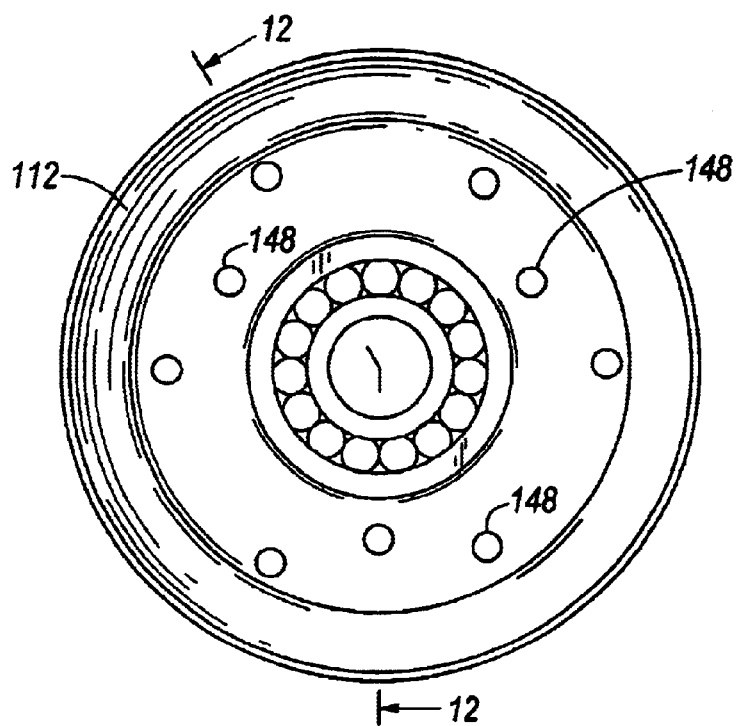
FIG. 11 is a top view of the output pulley assembly.
Figure 12:
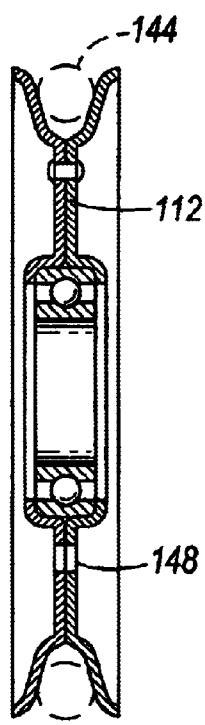
FIG. 12 is a cross-sectional view of the output pulley assembly taken along line 12—12 in FIG. 11.
Figure 13:
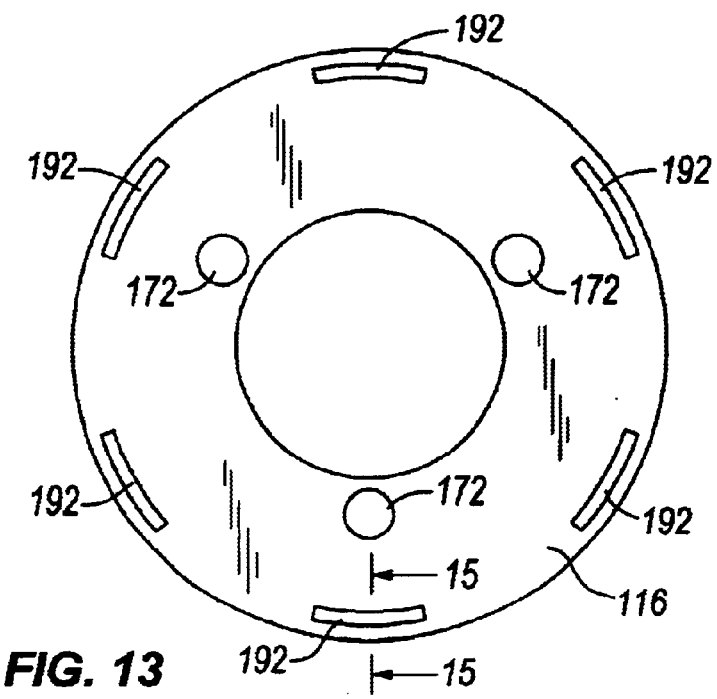
FIG. 13 is a top view of the support plate of the assembly.
Figure 14:
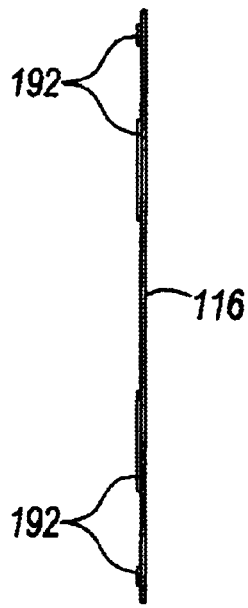
FIG. 14 is a side view of the support plate.
Figure 15:
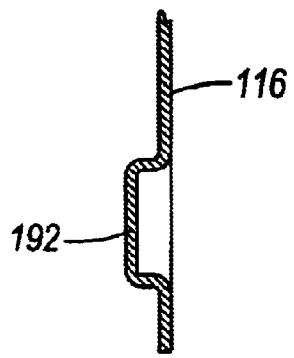
FIG. 15 is an enlarged cross-sectional view of the portion of the support plate taken along line 15—15 in FIG. 13.
Figure 16:
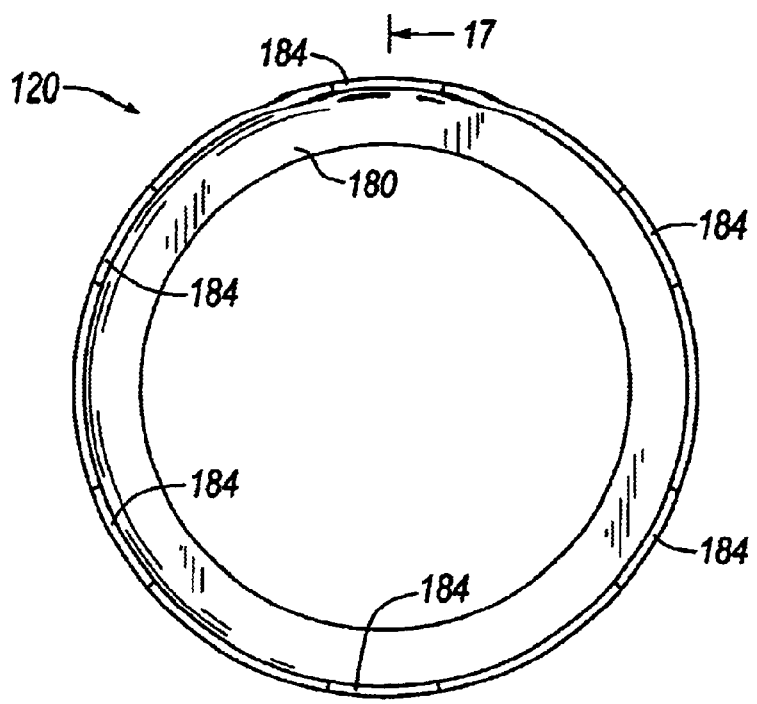
FIG. 16 is a bottom view of an upper output disk of the assembly.
Figure 17:
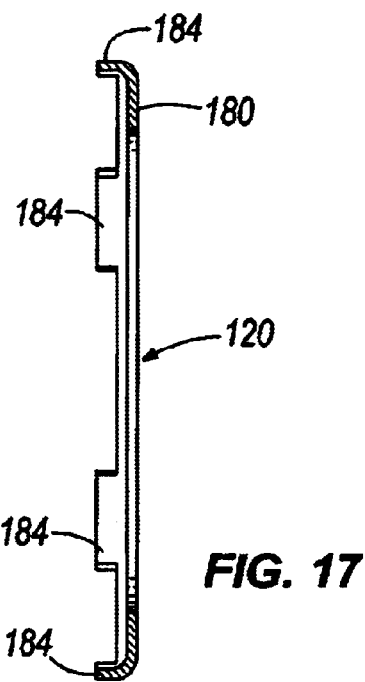
FIG. 17 is a cross-sectional view of the upper output disk taken along line 17—17 in FIG. 16.
Figure 18:
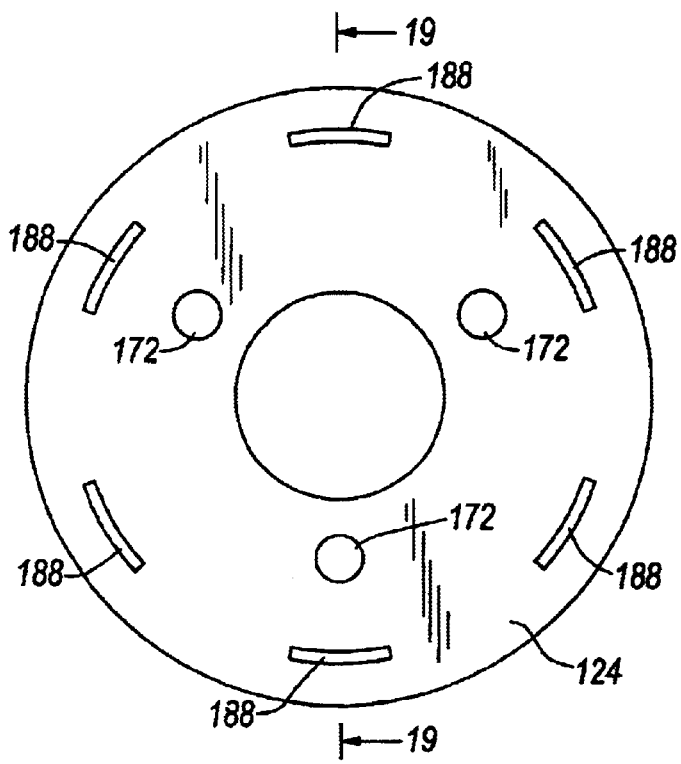
FIG. 18 is a top view of a lower output disk of the assembly.
Figure 19:
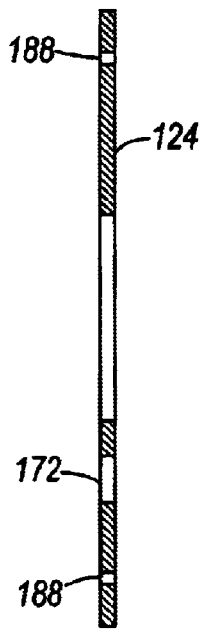
FIG. 19 is a cross-sectional view of the lower output disk taken along line 19—19 in FIG. 18.
Figure 20:
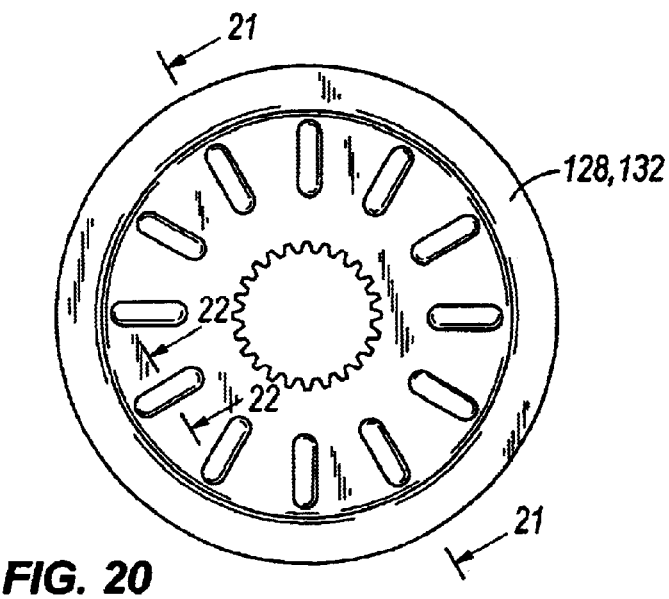
FIG. 20 is a top view of an input disk of the assembly.
Figure 21:
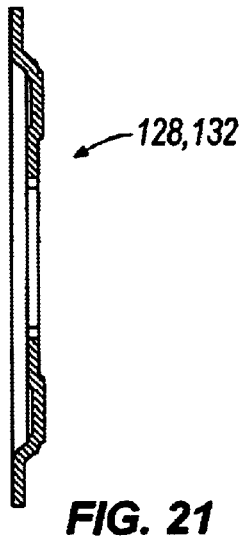
FIG. 21 is a cross-sectional view of the input disk taken along line 21—21 in FIG. 20.
Figure 22:
FIG. 22 is a cross-sectional view taken along line 22—22 in FIG. 20.
Figure 24:
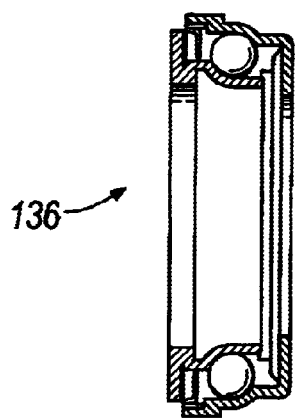
FIG. 24 is a cross-sectional view of the thrust bearing taken along line 24—24 in FIG. 23.
Figure 23:
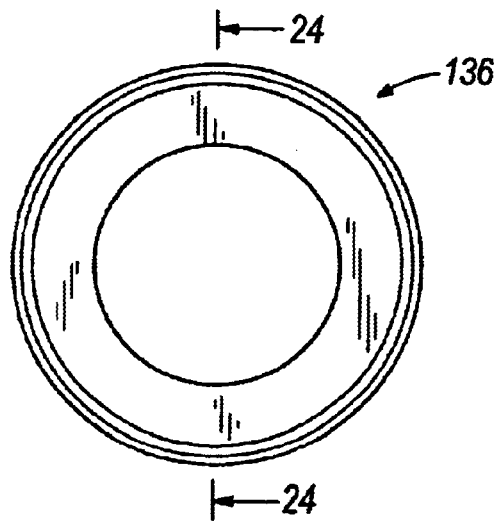
FIG. 23 is a top view of a thrust bearing of the assembly.

A housing 100 (FIGS. 6–8) is affixed to the outer race 84 of the upper bearing 64. The housing 100 extends radially from the upper bearing 64, and includes a lower flange portion 104 that provides a downwardly-facing braking surface 108. Below the housing 100 is an output pulley 112 (FIGS. 9–12), a support plate 116 (FIGS. 13–15), upper and lower output disks 120, 124 (FIGS. 16–19), upper and lower input disks 128, 132 (FIGS. 2022), a thrust bearing 136 (FIGS. 23 and 24), and an actuator assembly 140.

The output pulley 112 is affixed to the outer race 84 of the lower bearing 68, and receives a drive belt 144. The drive belt 144 is interconnected with pulleys (not shown) that are interconnected to working shafts, such as blade shafts (also not shown) having cutting blades attached thereto. The blade shafts are generally vertically-oriented, and are generally parallel to the output shaft 20 of the engine. When rotated, the blade shafts cause the blades to rotate and cut the grass over which the riding lawnmower is traveling. In an alternative construction, the output pulley 112 may be replaced with a shaft coupling that couples a blade shaft to the lower output disk 124 to drive the blade shaft directly without the drive belt 144.

Figure 25:
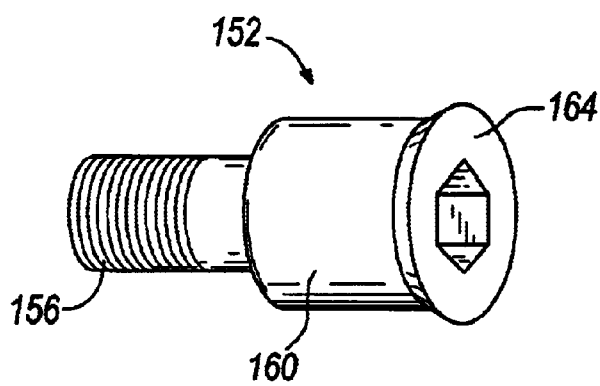
FIG. 25 is a perspective view of a drive stud of the assembly.

The output pulley 112 has extending therein three holes 148 that receive drive studs 152 (FIG. 25). Each drive stud 152 includes a threaded shank 156, an increased diameter smooth portion 160, and a flared top 164. Nuts 168 are threaded onto the threaded shanks 156 to sandwich the output pulley 112 between the nuts 168 and the increased diameter portions 160 of the studs 152. The support plate 116 and lower output disk 124 include holes 172 (FIGS. 13, 18, and 19) in alignment with the holes 148 in the output pulley 112. The increased diameter portions 160 of the drive studs 152 extend through the holes 172 in the support plate 116 and lower output disk 124. The output pulley 112, support plate 116, and lower output disk 124 are coupled for rotation together by the drive studs 152. Braking springs 176 surround the increased diameter portions 160 of the drive studs 152 and bias the support plate 116 and lower output disk 124 upwardly. The flared ends 164 of the drive studs 152 prevent the support plate 116 and lower output disk 124 from sliding off the top of the drive studs 152.

Figure 37:
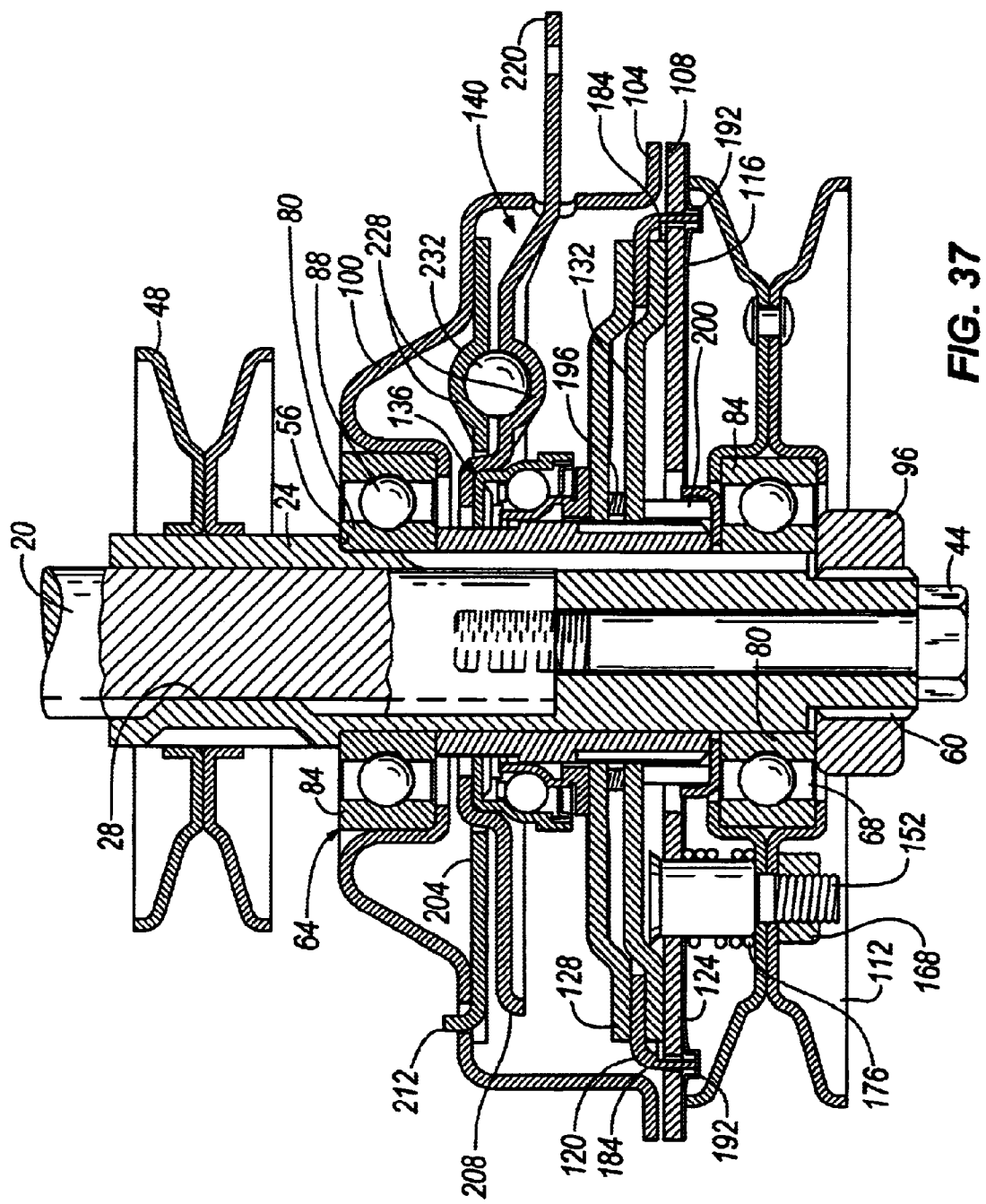
FIG. 37 is a cross-sectional view of the clutch/brake assembly of FIG. 1 in the driving position.

The upper output disk 120 (FIGS. 16 and 17) includes a substantially horizontal portion 180 and six depending tabs 184 extending substantially vertically down from the horizontal portion 180. The tabs 184 extend through corresponding slots 188 in the lower output disk 124 (FIGS. 18 and 19), and are received in corresponding pockets 192 (FIGS. 13–15) in the support plate 116. The upper output disk 120 is thereby coupled for rotation with the lower output disk 124 by virtue of the engagement between the tab 184 and slot 188, and is supported by the support plate pockets 192. The support plate 116 is preferably constructed of relatively thin material and acts as a resilient diaphragm or spring plate. More specifically, the support plate 116 is deflectable under the influence of a force acting on the upper output disk 120 (as shown in FIG. 37), and will return to an undeflected position illustrated in FIG. 1 once the force is removed.

Figure 27:
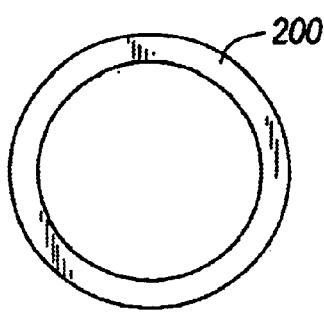
FIG. 27 is a top view of a support spring of the assembly.
Figure 26:
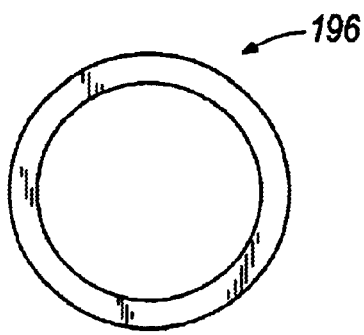
FIG. 26 is a top view of a separator spring of the assembly.
Figure 28:
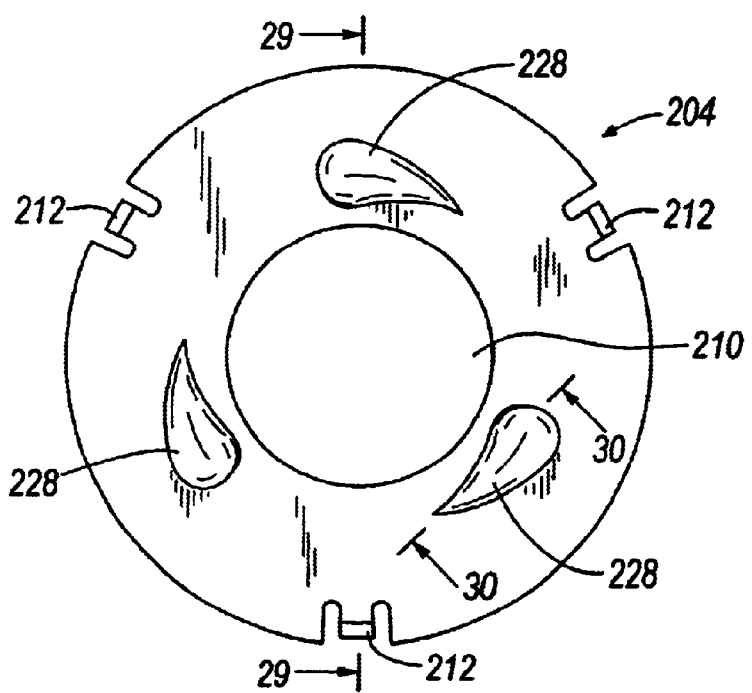
FIG. 28 is a top view of a top plate of the actuator assembly.
Figure 29:
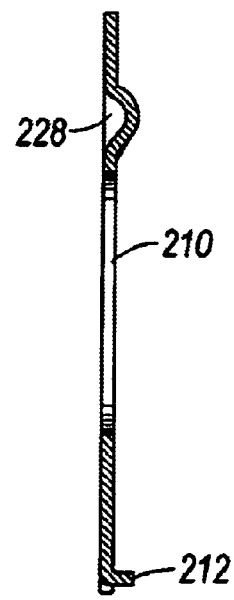
FIG. 29 is a cross-sectional view taken along line 29—29 in FIG. 28.
Figure 30:
FIG. 30 is a cross-sectional view taken along line 30—30 in FIG. 28.
Figure 31:
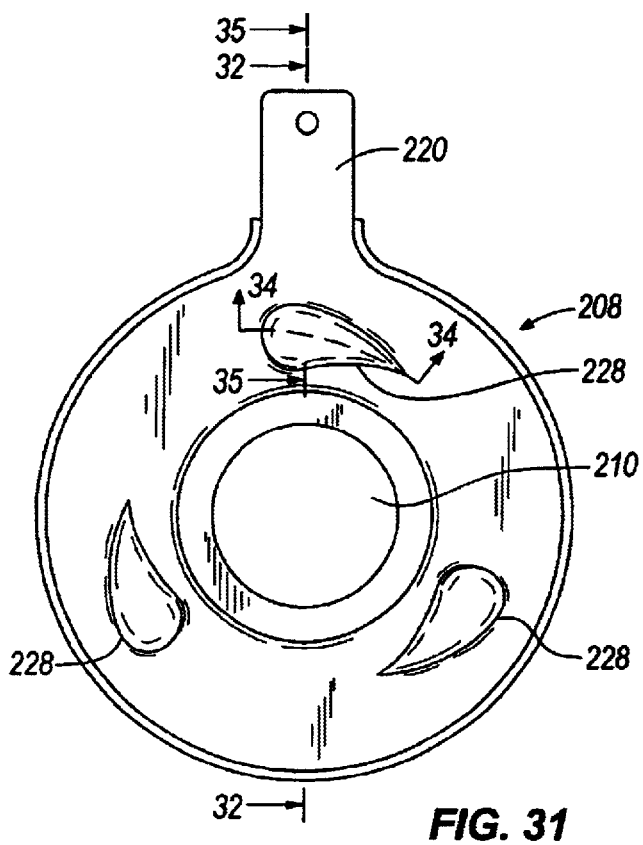
FIG. 31 is a bottom view of a bottom plate of the actuator assembly.
Figure 32:
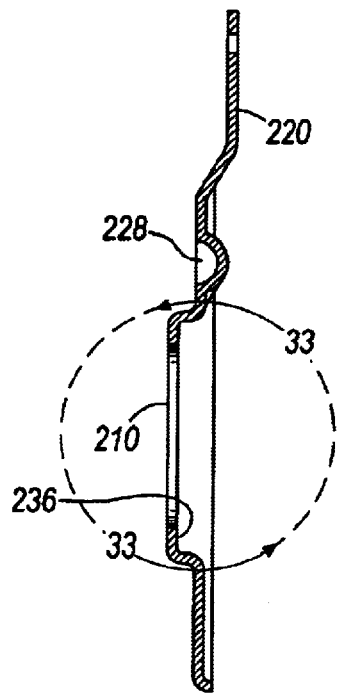
FIG. 32 is a cross-sectional view taken along line 32—32 in FIG. 31.
Figure 33:
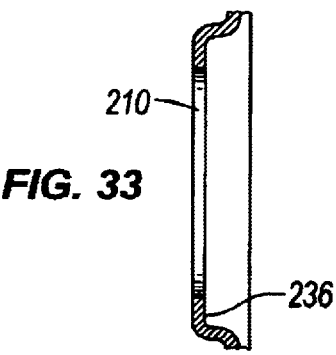
FIG. 33 is an enlarged view of the portion encircled in FIG. 32.
Figure 36:
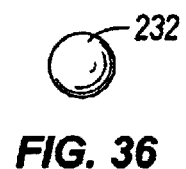
FIG. 36 is a side view of an actuator ball of the actuator assembly.
Figure 34:
FIG. 34 is a cross-sectional view taken along line 34—34 in FIG. 31.
Figure 35:
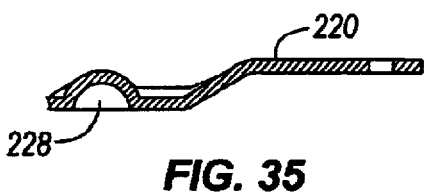
FIG. 35 is a cross-sectional view taken along line 35—35 in FIG. 31.

The upper and lower input disks 128, 132 are interconnected to the splined collar 72 by virtue of the splines 92. The splined interconnection causes the input disks 128, 132 to be rotationally fixed relative to the splined collar 72, but affords axial movement of the input disks 128, 132 along the splines 92. A separator spring 196 (FIG. 26) is interposed between the input disks 128, 132 to maintain separation therebetween, and a support spring 200 (FIG. 27) is interposed between the cup-shaped washer 76 and the lower input disk 132 to support the input disks 128, 132. The separator spring 196 and support spring 200 are preferably coil springs, but may alternatively take the form of any suitable biasing member. In their undeflected conditions (i.e., when the assembly is in the braking condition illustrated in FIG. 1), the springs maintain a space of 0.007–0.010 inches between the input disks 128, 132 and the respective output disks 120, 124.

With reference to FIGS. 28–36, the actuator assembly 140 includes upper and lower plates 204, 208 having central holes 210 through which the inner hub 24 extends. The upper plate 204 also includes three tabs 212 that each extend through three corresponding slots 216 (FIGS. 6 and 8) in the housing 100 to thereby fix the upper plate 204 to the housing 100. The lower plate 208 also includes an actuator handle or arm 220 that extends out of a side slot 224 (FIG. 8) in the housing 100. The lower plate 208 may be pivoted about the inner hub 24 with respect to the upper plate 204 by actuating the handle 220. The upper and lower plates 204, 208 each include three tear-drop shaped recesses 228 that face down and up respectively. The recesses 228 of the plates 204, 208 are generally mutually aligned and in opposed facing relation to define therebetween a cavity. An actuator ball 232 (FIG. 36) is captured within each cavity.

The lower plate 208 also includes a central hub 236 that extends up through the upper plate 204, and that receives a top race of the thrust bearing 136. A lower race of the thrust bearing 136 contacts the top of the upper input disk 128. The thrust bearing 136 is slidable along the outer surface of the inner hub 24.

As shown in FIG. 1, the clutch/brake assembly can be moved into a braking position. When in the braking condition, the outer portion of the lower output disk 124 is biased by the braking springs 176 against the braking surface 108 of the lower flange portion 104 of the housing 100. The frictional engagement between the lower output disk 124 and the braking surface 108 of the spring housing 100 resists rotation of the output pulley 112, which in turn stops the rotation of the cutting blades that are otherwise driven by the output pulley 112.

Also, while the clutch/brake assembly is in the braking position, the input disks 128, 132 are separated from the output disks 120, 124 by the springs 196, 200. The input disks 128, 132, splined collar 72, and output shaft 20 are therefore free to rotate without being coupled to the output disks 120, 124 and the output pulley 112.

To drivingly engage the output shaft 20 with the output pulley 112, as shown in FIG. 37, the actuator handle 220 is pivoted to move the tear drop recesses 228 in the lower plate 208 out of alignment with the tear drop recesses 228 of the upper plate 204. The actuator balls 232 contacting the recesses 228 act as wedges between the plates 204, 208, and drive the lower actuator plate 208 away from the upper actuator plate 204. The separation of the lower actuator plate 208 from the upper activator plate 204 causes the thrust bearing 136 to act on the upper input disk 128 down as well. The separator and support springs 196, 200 deflect under the downward force of the actuator assembly.

The upper input disk 128 engages the upper output disk 120 and pushes it against the support plate 116. The support plate 116 is deflected by the force transmitted through the upper output disk 120, and permits the upper output disk 120 to move down. The upper output disk 120 is pushed against the lower input disk 132, which in turn is pressed against the lower output disk 124. The braking springs 176 are also deflected, and the lower output disk 124 is moved down out of engagement with the braking surface 108 of the housing 100.

The input and output disks 120, 124, 128, 132 are therefore sandwiched together and are coupled by friction forces for common rotation. The frictional engagement of the input and output disks 120, 124, 128, 132 drivingly connects the output shaft 20 to the output pulley 112 so that rotation of the output shaft 20 causes rotation of the output pulley 112. In this manner, the blade shafts are rotated under the power of the engine. Because there are multiple disks 120, 124, 128, 132 in the assembly, more power may be transferred from the output shaft 20 to the output pulley 112 than in conventional clutch/brake assemblies.

While only a single embodiment of the invention has been illustrated and described, it is not intended to be limited thereby, but only by the scope of the appended claims.

What is claimed is:

1. A clutch/brake assembly comprising:
    at least two input disks movable between a braking position and a driving position;
    at least two output disks movable between a braking position and a driving position;
    a housing including a braking surface;
    a biasing member biasing at least one of the output disks against the braking surface of the housing to resist rotation when the disks are in their respective braking positions; and
    an actuator assembly operable to substantially simultaneously disengage the output disks from the braking surface of the housing and sandwich the input and output disks together in the driving position, such that the input and output disks are coupled together for rotation by the frictional forces therebetween.

2. The clutch/brake assembly of claim 1, wherein the input disks are movable axially relative to one another.

3. The clutch/brake assembly of claim 1, wherein the output disks are movable axially relative to one another.

4. The clutch/brake assembly of claim 1, wherein the two input disks sandwich one of the output disks therebetween and the two output disks sandwich one of the input disks therebetween when in the driving position.

5. The clutch/brake assembly of claim 1, wherein the biasing member further comprises a plurality of springs.

6. The clutch/brake assembly of claim 1, wherein the pair of output disks include a lower output disk and an upper output disk, the upper output disk coupled to the lower output disk such that the disks rotate in conjunction and are free to move axially relative to one another, and wherein the biasing member biases the lower output disk toward the braking position.

7. The clutch/brake assembly of claim 6, further comprising a second biasing member biasing the upper output disk toward the braking position.

8. The clutch/brake assembly of claim 7, wherein the second biasing member is a spring plate.

9. The clutch/brake assembly of claim 1, further comprising a third biasing member biasing the input disks toward their braking positions.

10. The clutch/brake assembly of claim 9, wherein the third biasing member is a coil spring.

11. The clutch/brake assembly of claim 1, wherein each of the input disks includes a spline connection engagable with a spline portion of the input shaft.

12. The clutch/brake assembly of claim 1, wherein the input disks include an upper input disk, a lower input disk, and a fourth biasing member therebetween, the biasing member biasing the upper disk toward its braking position.

13. The clutch/brake assembly of claim 12, wherein the fourth biasing member is a spring.

14. A brake/clutch assembly comprising:
a housing:
an input shaft supported for rotation relative to the housing;
a plurality of input disks connected to the input shaft;
a plurality of output disks rotatable relative to the input shaft, the plurality of output disks selectively engaged with the plurality of input disks, at least one of the plurality of output disks selectively engaged with the housing;
a biasing member biasing the at least one of the plurality of output disks into engagement with the housing; and
an actuating member operable to move the input disks into engagement with the output disks and to simultaneously move the output disk out of engagement with the housing.

15. The clutch/brake assembly of claim 14, wherein the plurality of input disks are movable axially relative to one another.

16. The clutch/brake assembly of claim 14, wherein the plurality of output disks are movable axially relative to one another.

17. The clutch/brake assembly of claim 14, wherein the plurality of input disks and the plurality of output disks intermesh with one another when engaged.

18. The clutch/brake assembly of claim 14, wherein the biasing member further comprises a plurality of springs.

19. The clutch/brake assembly of claim 14, wherein the plurality of output disks includes a lower output disk and an upper output disk, the upper output disk coupled to the lower output disk such that the disks rotate in conjunction and are free to move axially relative to one another, and wherein the biasing member biases the lower output disk toward an engagement position with the housing.

20. The clutch/brake assembly of claim 19, further comprising a second biasing member biasing the upper output disk toward a position at which the upper output disk does not engage the input disks.

21. The clutch/brake assembly of claim 20, wherein the second biasing member is a spring plate.

22. The clutch/brake assembly of claim 14, further comprising a third biasing member biasing the input disks out of engagement with the output disks.

23. The clutch/brake assembly of claim 22, wherein the third biasing member is a coil spring.

24. The clutch/brake assembly of claim 14, wherein each of the input disks includes a spline connection engagable with a spline portion of the input shaft.

25. The brake/clutch assembly of claim 14, wherein the input disks include an upper input disk, a lower input disk, and a fourth biasing member therebetween, the biasing member biasing the upper input disk toward a position at which the upper disk does not engage the output disks.

26. The clutch/brake assembly of claim 25, wherein the fourth biasing member comprises a spring.

27. A brake/clutch assembly comprising:
a housing;
an input shaft supported for rotation relative to the housing;
an output device supported by the input shaft and selectively rotatable relative to the input shaft;
a plurality of input disks coupled to the input shaft and axially movable relative to the input shaft and to one another between a braking position and a driving position, the input disks including a plurality of drive surfaces;
a plurality of output disks coupled to the output device and movable axially relative to the output device and to one another between a braking position and a driving position, the output disks including a plurality of drive surfaces and a brake surface;
an actuator member operable between a braking position and a drive position, such that when in the braking position the brake surface contacts the housing and when the actuator is in the drive position the drive surfaces of the input disks contact the drive surfaces of the output disks such that the output device rotates in conjunction with the input shaft; and
a biasing member biasing the output disk brake surface into contact with the housing.

28. The clutch/brake assembly of claim 27, wherein the plurality of input disks and the plurality of output disks intermesh with one another when in the driving position.

29. The clutch/brake assembly of claim 27, wherein the biasing member further comprises a plurality of springs.

30. The clutch/brake assembly of claim 27, wherein the plurality of output disks includes a lower output disk and an upper output disk, the upper output disk coupled to the lower output disk such that the disks rotate in conjunction and are free to move axially relative to one another, and wherein the biasing member biases the lower output disk toward an engagement position with the housing.

31. The clutch/brake assembly of claim 30, further comprising a second biasing member biasing the upper output disk toward the braking position.

32. The clutch/brake assembly of claim 31, wherein the second biasing member is a spring plate.

33. The clutch/brake assembly of claim 27, further comprising a third biasing member biasing the input disks toward the braking position.

34. The clutch/brake assembly of claim 33, wherein the third biasing member is a coil spring.

35. The clutch/brake assembly of claim 27, wherein each of the input disks includes a spline connection engagable with a spline portion of the input shaft.

36. The clutch/brake assembly of claim 27, wherein the input disks include an upper input disk, a lower input disk, and a fourth biasing member therebetween, the biasing member biasing the upper disk toward its braking position.

37. The clutch/brake assembly of claim 36, wherein the fourth biasing member is a spring.

* * * * *